United States Patent
Maled

[11] 3,841,012
[45] Oct. 15, 1974

[54] ECCENTRIC MOTION FISHING LURE

[76] Inventor: Christopher T. Maled, 733 Tranquil Trl., R.R. No. 6, Greenwood, Ind. 46142

[22] Filed: Mar. 9, 1973

[21] Appl. No.: 339,638

[52] U.S. Cl.................................. 43/26.2, 43/17.1
[51] Int. Cl............................................. A01k 85/06
[58] Field of Search.................. 43/26.1, 26.2, 17.1

[56] References Cited
UNITED STATES PATENTS
| | | | |
|---|---|---|---|
| 3,065,564 | 11/1962 | Dawes | 43/26.2 |
| 3,120,073 | 2/1964 | Brunton | 43/17.1 |
| 3,728,811 | 4/1973 | Weimer | 43/26.2 |

*Primary Examiner*—Louis G. Mancene
*Assistant Examiner*—J. N. Eskovitz
*Attorney, Agent, or Firm*—Woodard, Weikart, Emhardt & Naughton

[57] ABSTRACT

An artificial fishing lure having eccentric motion. The lure includes a hollow main body with a motor and battery mounted therein. The battery connected to the motor causes the motor output shaft to rotate which has a weight mounted thereon. The weight has a center of gravity positioned outwardly from the axis of rotation of the shaft thereby imparting eccentric motion to the lure as the shaft rotates.

6 Claims, 2 Drawing Figures

PATENTED OCT 15 1974　　　　　　　　　　3,841,012

ECCENTRIC MOTION FISHING LURE

BACKGROUND OF THE INVENTION

1. Field of the Invention

This invention is in the field of artificial fishing lures.

2. Description of the Prior Art

A fisherman typically imparts irregular motion to an artificial fishing lure as the lure is pulled through the water. Some lures have been devised which have trailing fins which are loosely mounted so as to irregularly move as the lure moves through the water. Disclosed herein is an artificial fishing lure which has irregular motion imparted by a motor mounted within the lure main body. It is generally known to mount small direct current motors within an artificial fishing lure body such as shown in the following U.S. Pat. Nos.:

2,817,920 issued to Raymond P. Mitchell et al.;
2,955,375 issued to Raymond P. Mitchell;
3,065,564 issued to Herbert G. Dawes; and
3,085,361 issued to Orville E. Rhodes.

The lures disclosed in these patents utilize the small electric motors for moving various external parts such as a tail section or a propellor. The lure disclosed herein includes a weight mounted off center to the output shaft of the electric motor thereby imparting eccentric motion to the lure.

SUMMARY OF THE INVENTION

One embodiment of the present invention is an artificial fishing lure comprising a hollow main body, a battery removably mounted in the body, a direct current motor mounted in the housing being electrically connected to the battery and having a rotatable output shaft with an axis of rotation and a weight mounted on the shaft and having a center of gravity spaced radially from the axis of rotation imparting eccentric motion to the main body as the shaft rotates.

It is an object of the present invention to provide an artificial fishing lure having self-contained means for moving eccentrically.

A further object of the present invention is to provide a new and improved artificial fishing lure.

In addition, it is an object of the present invention to provide a fishing lure having a motor mounted therein with a weight mounted off center to the motor output shaft.

Related objects and advantages of the present invention will be apparent from the following description.

DESCRIPTION OF THE PREFERRED EMBODIMENT

Figure 1:
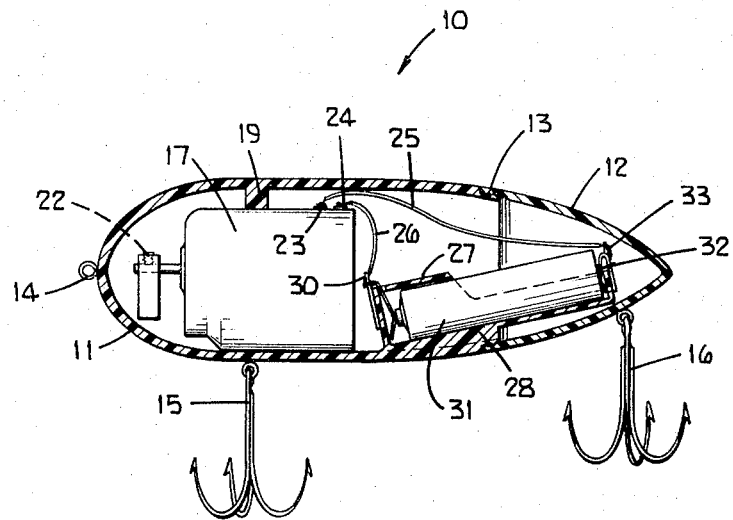
FIG. 1 is a fragmentary view of a lure incorporating the present invention.
Figure 2:
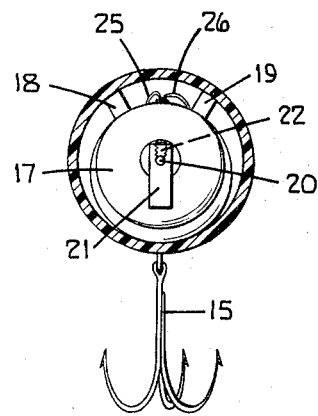
FIG. 2 is a cross sectional view taken along the line 2—2 of FIG. 1 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an artificial fishing lure 10 having a hollow main body composed of a head portion 11 and a tail section 12 which are removably and sealingly connected together by threads 13. Tail section 12 includes threads which are in meshing engagement with mating threads on head portion 11. A pair of hooks 15 and 16 are mounted respectively to head portion 11 and tail portion 12. An eyelet 14 is mounted to the nose of head portion 11 to secure the lure to a fishing line.

A direct current motor 17 is fixedly mounted in head portion 11 near eyelet 14 and is electrically connected to battery 31 by wires 25 and 26. Motor 17 has a rotatable output shaft 20 with a weight 21 mounted thereon. The center of gravity of weight 21 is spaced radially from the axis of rotation of shaft 20 thereby imparting eccentric motion to the main body of the lure as the shaft rotates. Weight 21 is a lead plate. It should be noted that weight 21 and motor 17 are positioned near eyelet 14. A pair of rigid plastic stabilizers 18 and 19 fixedly secure motor 17 to head portion 11 to prevent relative motion therebetween. Weight 21 is secured to shaft 20 by a set screw 22. The electrical terminals 23 and 24 of motor 17 are connected by wires 25 and 26 to terminals 33 and 30 of holder 27.

Holder 27 is a plastic casing fixedly secured to head portion 11. A metal spring is connected to terminal 30 and contacts one end of battery 31 which may be slipped into holder 27. It should be noted that head portion 11 is integrally connected by means 28 to holder 27. Spring 32 is in contact with one end of the battery and terminal 33.

It will be obvious from the above description that the present invention provides a new and improved artificial fishing lure. It will be further obvious from the above description that the present invention provides an artificial fishing lure which has self-contained means for imparting eccentric motion to the lure.

While the invention has been illustrated and described in detail in the drawings and foregoing description, the same is to be considered as illustrative and not restrictive in character, it being understood that only the preferred embodiment has been shown and described and that all changes and modifications that some within the spirit of the invention are desired to be protected.

The invention claimed is:

1. An artificial fishing lure comprising:
   a hollow main body, said main body including a head portion and a tail portion removably and sealingly connected together with said head portion having connecting means mounted thereon connectable to a fishing line;
   a battery removably mounted in said body;
   a direct current motor mounted in said main body, said motor being electrically connected to said battery and having a rotatable output shaft with an axis of rotation;
   a weight mounted on said shaft and having a center of gravity spaced radially from said axis of rotation imparting eccentric motion to said main body as said shaft rotates; and locking means in said main body fixedly securing said motor to said head portion to prevent relative motion therebetween.

2. The artificial fishing lure of claim 1 wherein:
said main body includes a holder secured thereto removably holding said battery in said main body.

3. The artificial fishing lure of claim 2 wherein:
said head portion has a fish hook mounted thereto and said tail portion has a fish hook mounted thereto.

4. The artificial fishing lure of claim 3 wherein:
said weight is a lead plate.

5. The artificial fishing lure of claim 4 wherein:
said holder is fixedly secured to said head portion; and,
said tail portion includes threads in meshing engagement with mating threads on said head portion.

6. An artificial fishing lure comprising:
a hollow main body, said main body including a head portion and a tail portion removably and sealingly connected together with said head portion having connecting means mounted thereon connectable to a fishing lure, said main body further including locking means fixedly securing said motor to said head portion to prevent relative motion therebetween.
a battery removably mounted in said body, said battery being held securely by a holder mounted in said main body,
a direct current motor mounted in said main body, said motor being electrically connected to said battery and having a rotatable output shaft with an axis of rotation; and,
a lead weight mounted on said shaft and having a center of gravity spaced radially from said axis of rotation imparting eccentric motion to said main body as said shaft rotates.

* * * * *

UNITED STATES PATENT OFFICE
CERTIFICATE OF CORRECTION

Patent No. 3,841,012　　　　　　　　Dated October 15, 1974

Inventor(s) Christopher T. Maled

It is certified that error appears in the above-identified patent and that said Letters Patent are hereby corrected as shown below:

In column 4, line 4, after the word "fishing" and before the ",", please change "lure" to --line--.

Signed and sealed this 17th day of December 1974.

(SEAL)
Attest:

McCOY M. GIBSON JR.　　　　　　C. MARSHALL DANN
Attesting Officer　　　　　　　　Commissioner of Patents